United States Patent [19]

Hwang

[11] 4,282,118
[45] Aug. 4, 1981

[54] ELECTROCONDUCTIVE POLYMER COMPOSITION

[75] Inventor: Mei H. Hwang, Pittsburgh, Pa.

[73] Assignee: Calgon Corporation, Pittsburgh, Pa.

[21] Appl. No.: 69,029

[22] Filed: Aug. 23, 1979

Related U.S. Application Data

[63] Continuation-in-part of Ser. No. 960,808, Nov. 15, 1978, abandoned.

[51] Int. Cl.$^3$ ............................................. H01B 1/06
[52] U.S. Cl. ................................... 252/518; 252/500; 430/69; 430/270; 525/4
[58] Field of Search .................. 252/500, 518; 430/69, 430/270; 526/4; 260/567.6 M; 428/514, 537, 538, 539

[56] References Cited

U.S. PATENT DOCUMENTS

| | | | |
|---|---|---|---|
| 3,544,318 | 12/1970 | Boothe | 430/69 |
| 3,925,074 | 12/1975 | Wyhof | 430/69 |
| 3,953,374 | 4/1976 | Windhager | 252/518 |
| 3,966,987 | 6/1976 | Suzuki et al. | 252/500 |
| 4,011,176 | 3/1977 | Saunders | 252/500 |
| 4,084,034 | 4/1978 | Jansma | 252/500 X |
| 4,093,564 | 6/1978 | Moll | 252/500 |
| 4,126,468 | 1/1978 | Kitteredge | 430/270 |
| 4,132,674 | 1/1979 | Hwong | 252/500 |

*Primary Examiner*—Benjamin R. Padgett
*Assistant Examiner*—J. L. Barr
*Attorney, Agent, or Firm*—Mario A. Monaco; Martin L. Katz

[57] ABSTRACT

An electroconductive polymer composition containing an electroconductive polymer, a fluorosurfactant and a stabilizer.

4 Claims, No Drawings

ELECTROCONDUCTIVE POLYMER COMPOSITION

This application is a continuation-in-part of U.S. Ser. No. 960,808, filed Nov. 15, 1978, now abandoned.

This invention relates to a process for preparing a polymer composition having improved solvent holdout and tack properties of conductive polymers. More particularly, this invention relates to a process for preparing a temperature stable, tack and solvent holdout improved conductive polymer composition. Such composition may be applied to paper raw stock, surface sized and non-surface sized, and the resultant coated paper will have solvent holdout, conductivity and tack properties that are acceptable as electroconductive base stocks for electrographic and electrophotographic papers. The process comprises incorporating into a conductive polymer an effective quantity of a fluorosurfactant and a stabilizer. This invention also relates to the resultant electroconductive polymer composition.

In general, electroconductive base sheets for use in the manufacture of electrographic and electrophotographic reproduction papers are prepared by applying to one or both surfaces of a suitable paper substrate (a publication grade paper of basis weight in the range of 30 to 45 pounds per 3,000 square feet) a resinous conductive layer to render the paper electroconductive. Commonly the conductive layer comprises an electroconductive polymer either alone or more usually, formulated with a binder (normally a water-soluble, non-conductive, film-forming polymer such as a protein, starch styrene-butadiene latices, a modified or converted starch, casein, polyvinylacetate, polyvinylalcohol, copolymer of ethylene and vinylacetate, and the like) and with a pigment (such as calcium carbonate, kaolin clay, titanium dioxide, alumina or a combination of these materials). In the electrostatic paper industry, such formulations including a conductive agent, a binder and a pigment are commonly referred to as coating formulations or compositions.

The binders in conventional conductive coating formulations serve to make the paper less porous, more uniform, to improve the adherence of the conductive layer to the base paper and, importantly, to impart to the conductive layer the properties of a holdout or barrier coating to prevent solvents employed in the later applied photosensitive or dielectric layers from penetrating into the conductivized paper. A separate non-conductive solvent holdout layer comprising one or a mixture of conventional binders is applied to the paper prior to the application of the conductive layer in order to assist in achieving a solvent holdout effect. Solvent holdout to toluene and, in some cases, parafinic solvents is essential because the top side of a conductive base paper comes into contact with toluene during the subsequent application of the photosensitive or dielectric coating which comprises dye-sensitized zinc oxide or dielectric resin dispersed in toluene and a binder. In some cases, the back side of the zinc oxide or dielectric coated base stock (now referred to as finished Electrofax or dielectric paper) comes into contact with kerosene during the copying process inside copy machines that use "wet" toners which are comprised of carbon particles suspended in a solution of kerosene and binders. The usual type of electroconductive polymer in combination with the usual type of coating additives, such as the binders and pigments mentioned above, will not give acceptable solvent holdout when applied at commercially feasable coatweights of from 1 to 4 pounds of coating per 3,000 square feet per paper surface where attempts are made to prepare the conductive base sheet in an obviously desirable one-pass process without pretreatment of the paper raw stock with a separate solvent holdout layer.

The instant invention is based upon applicant's discovery that the temperature stability and solvent holdout properties of conventional electroconductive polymers commonly employed in such formualtions can be markedly enhanced by incorporating into such polymers an effective quantity of a stabilizer, such as caustic, and a fluorosurfactant of the type hereinafter described. Applicant has found that the improved polymer composition of this invention will give to the conductive base sheet conductivity, zinc oxide and dielectric resin topcoatability, rebrokability of broke and enhanced solvent holdout properties and low tack that are commercially acceptable for the manufacture of electrographic and electrophotographic papers according to current industry standards and practices when applied to a non-surface sized raw stock (a raw stock that has no surface treatment of starch, alginate or other surface sizing material), as well as barrier coated raw stock. The improved polymer composition of this invention, therefore, not only possesses temperature stability and provides enhanced solvent holdout and reduced tack properties, but makes possible the application of the electroconductive layer to the base sheet in a one-pass operation thus eliminating any necessity for the application of separate solvent holdout layers. The conductivity, zinc oxide and dielectric topcoatabiltiy, rebrokability and solvent holdout properties obtained through the use of the improved polymer composition of this invention have been confirmed employing standard laboratory techniques. It is contemplated, therefore, that suitable coatweights of the improved polymer composition of this invention will be employed in the manufacture of electroconductive base sheets suitable for the preparation of electrophotographic and electrographic papers.

The nature of the electroconductive polymer component of the improved polymer composition of this invention is not critical. Any of a variety of electroconductive polymers, both cationic and anionic, may be employed provided that the conductive polymer selected has a Brookfield Viscosity at 25° C. of less than about 1500 and is capable of imparting adequate conductivity to the base raw stock (industry requirements for conductivity in base sheets are $10^8$ to $10^{10}$ [ohms per square] decade at 15% relative humidity). As cationic electroconductive polymers, there may be employed any water-soluble cationic polymer containing quaternary ammonium functional groups. Included in such cationic polymers are those of the formula:

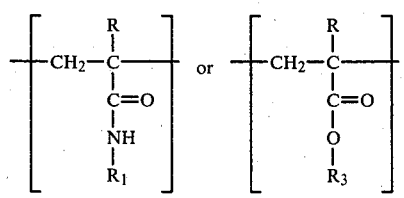

wherein:
R stands for hydrogen or lower alkyl;
$R_1$ represents a member of the class composed of:

 or

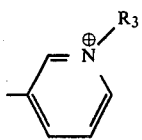

$R_2$ stands for:

wherein, in turn,

A represents a lower alkylene, an hydroxy-lower alkylene or lower-alkyl-substituted lower alkylene group, and $R_3$ stands for a lower alkyl group.

These polymers include those wherein the quaternary ammonium functional group is carried as a pendant group to the principal polymer chain, such as, for example, polyvinyl benzyl trimethyl ammonium chloride, poly-[alpha-(methylene trimethyl ammonium chloride)ethylene oxide] and poly(methacryloloxyethyl trimethyl ammonium chloride). Also useful are those polymers wherein the quaternary ammonium functional group is incorporated in a cyclic structure which comprises a portion of the polymer backbone, such as, for example, polymers containing repeating units of the formula:

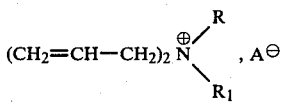

where R is an alkyl group of 1 to 18 carbon atoms and $R_1$ is R or β-propionamido and A is an anion. A preferred polymer of this class is poly-(dimethyldiallyl ammonium chloride); and those wherein the quaternary ammonium functional group forms a part of the polymer chain, such cationic polymers being commonly designated as, "ionenes".

Included in this group, for example, are ionene polymers prepared from halo alkyl dialkyl amine monomer units, such as 3-ionene(poly-dimethyl propyl)ammonium chloride), prepared by the polymerization of 3-chloropropyl dimethyl amine, and ionene polymers prepared from di-tertiaryamines and dihalides, such as 3,4-ionene which is prepared from 1,3-bis-dimethylamino propane and 1,4-dichlorobutene. Other ionene polymers, of course, which are prepared similarly, may be employed as the electroconductive component of the polymer composition of this invention.

In addition to the cationic electroconductive polymers mentioned above, water-soluble cationic phosphonium and sulfonium polymers also may be employed as the electroconductive component in the polymer composition of this invention. Included among these are polymers, such as, for example, poly-(2-acryloxyethyl-dimethyl sulfonium chloride) and poly-(glycidyltributyl phosphonium chloride) and the like.

Water-soluble anionic polymers useful in the preparation of the polymer composition of this invention typically are polymeric acids and alkali metal and alkaline earth metal salts. Included among such anionic polymers are, for example, poly(sulfostyrene), poly(allyl sulfonic) acid, sulfonated urea-formaldehyde resin, sulfonated polymethylolacrylamide and the like.

It should be noted that the typical cationic and anionic polymers mentioned above may contain one or more other mer units. For example, copolymers such as the copolymer of dimethyl diallyl ammonium chloride and diacetone acrylamide or the copolymer of styrene and maleic anhydride also can be used as the electroconductive component of the polymer composition of this invention. The ratio of mer units in such copolymers will be determined by the quantity of cationic or anionic necessary to impart the desired surface resistivity to the base sheet.

Although any of the electroconductive polymers noted above or other electroconductive polymer capable of imparting the necessary degree of surface resistivity to the base sheet may be employed as the electroconductive component in the improved polymer composition of this invention, the preferred electroconductive polymers are the cationic polymers and copolymers and especially cationic quaternary ammonium polymers and copolymers. Of these, the most preferred polymers are poly-(dimethyldiallylammonium chloride), copolymers of dimethyl diallyl ammonium chloride and diacetone acrylamide containing from 70 to 98% diallyl monomer, polyvinylbenzyl trimethyl ammonium chloride, poly-methacryloloxyethyl trimethyl ammonium chloride, polymethacryloloxytrimethylammonium methosulfate, polyepichlorohydrin 80 to 100% quaternized with trimethylamine, copolymers of acrylamide and methacryloloxyethyl trimethyl ammonium chloride containing from 90 to 99.5% methacryloloxyethyl monomer and poly-(methacryloloxyethyl dimethyl hydroxyethyl ammonium chloride).

The fluorosurfactant component of the improved electroconductive polymer composition of this invention is essential to achieving the enhanced solvent hold-out properties displayed by the improved polymer composition. Applicant has found that certain mono- and bis-(1H,1H,2H,2H-perfluoroalkyl)phosphate esters, when incorporated into electroconductive polymer compositions in the quantities specified below, are effective in imparting to such compositions improved solvent holdout properties. In general, useful perfluoroalkyl phosphate esters will have the formula:

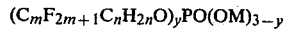

wherein m is an integer between 4 and 10, n is an integer between 1 and 11, y is 1 or 2 and M is a water-solubilizing cation, such as, for example, an alkali-metal (Li, K, Na and the like), ammonium or substituted ammonium including methylamine, dimethylamine, diethylamine, monoethanolamine, diethanolamine, triethanolamine or morpholine and the like. Preferred salts generally are the diethanolamine salts. Desirably, $C_m$ and $C_n$, taken together, constitute a straight chain of at least 8 carbon atoms. Such perfluoroalkyl phosphate esters are well-known materials and are available commercially or readily prepared by methods fully described in the art. Particularly preferred is the perfluoroalkyl phosphate ester manufactured by E. I. du Pont de Nemours Company, Inc., Wilmington, Del., under the Trademark, ZONYL RP and ZONYL FSE, which contain diethanolamine salts of mono- and bis-(1H,1H,2H,2H-perfluoroalkyl)phosphates where the alkyl group is even numbered in the range $C_8$-$C_{18}$ and the salts have a fluorine content of 52.4 to 54.4% as determined on a solids basis. Also useful are fluorosurfactants such as ammonium bis(N-ethyl-2-perfluoroalkylsulfonamido ethyl)-phosphates containing not more than 15% ammonium mono(N-ethyl-2-perfluoroalkylsulfonamido ethyl)phosphates, where the alkyl group is more than 95% $C_8$ and the salts have a fluorine content of 50.2% to 52.8% as determined on a solids basis. Materials of this type are sold by 3M Co., Inc., under the Trademark SCOTCHBAN.

Suitable stabilizers such as caustic, potassium hydroxide and ammonium hydroxide are added to the polymer composition to control the pH of the polymer and impart temperature stability thereto. The composition of the instant invention is stable at a pH of 8.0 or more.

The weight percent of the several components of the novel polymer composition of this invention may vary greatly. In general, they contain from 90 to 99.5% by weight electroconductive polymer, 0.5 to 10% by weight fluorosurfactant and sufficient stabilizer to adjust the pH to 8.0 or more.

The weight percent (dry coating) of the components in the coating formulations using the polymer composition of this invention may vary widely. In general, the electroconductive polymer composition of this invention will constitute from 0.5 to 95% by weight of the formulation; the binder will constitute from 5 to 80% by weight of the formulation. If desirable, the formulation may also contain from 5 to 95% by weight of a pigment. Such formulations are typical of the coating formulations typically employed in the manufacture of electroconductive base sheets.

The results set forth in the following tables illustrate the benefits of the stabilizer of the instant invention.

TABLE I

APPEARANCES OF 25% POLYMER 261LV/ZONYL RP (98/2) SOLUTIONS MADE WITH POLYMER 261LV OF VARIOUS VICOSITIES

| Brookfield Viscosity (cps) at 25° C. | Solution Appearance As Prepared |
|---|---|
| 550 | Slightly Cloudy |
| 700 | Slightly Cloudy |
| 1000 | Slightly Cloudy |
| 1100 | Slightly Cloudy |
| 1400 | Cloudy |
| 1890 | Precipitation on Top and Bottom of Solution |

TABLE II

STABILITY OF POLYMER 261LV/ZONYL RP AT VARIOUS pH ADJUSTED BY DIFFERENT CHEMICALS

| pH | NaOH at 25° C. | NH4OH at 25° C. | Na2CO3 at 25° C. | KOH at 25° C. |
|---|---|---|---|---|
| 24 Hours | | | | |
| 8.0 | 2 | 2 | 2 | 2 |
| 8.5 | 1 | 2 | 2 | 2 |
| 9.0 | 1 | 1 | 1 | 1 |
| 9.5 | 1 | 1 | 2 | 1 |
| 10.0 | 1 | 1 | 2 | 1 |
| 10.5 | 1 | 1 | 2 | 1 |
| 11.0 | 1 | 2 | 2 | 1 |
| 48 Hours | | | | |
| 8.0 | 2 | 2 | 2 | 2 |
| 8.5 | 2 | 2 | 2 | 2 |
| 9.0 | 1 | 1 | 1 | 1 |
| 9.5 | 1 | 1 | 2 | 1 |
| 10.0 | 1 | 1 | 2 | 1 |
| 10.5 | 1 | 1 | 2 | 1 |
| 11.0 | 1 | 2 | 2 | 1 |
| 5 Days | | | | |
| 8.0 | 2 | 2 | 2 | 2 |

TABLE II-continued

STABILITY OF POLYMER 261LV/ZONYL RP AT VARIOUS pH ADJUSTED BY DIFFERENT CHEMICALS

| pH | NaOH at 25° C. | NH4OH at 25° C. | Na2CO3 at 25° C. | KOH at 25° C. |
|---|---|---|---|---|
| 8.5 | 2 | 2 | 2 | 2 |
| 9.0 | 1 | 1 | 1 | 1 |
| 9.5 | 1 | 1 | 2 | 1 |
| 10.0 | 1 | 1 | 2 | 1 |
| 10.5 | 1 | 1 | 2 | 1 |
| 11.0 | 1 | 2 | 2 | 1 |

1 - Stable Solutions
2 - Solutions Contain Sediment

TABLE III

COMPOSITION AND STABILITY OF CONDUCTIVE POLYMER PRODUCTS CONTAINING FLUOROCARBONS

| Compositions* | Storage Stability Tests (5 days) | | |
|---|---|---|---|
| | 4° C. | 25° C. | 45° C. |
| 97.78% CP-261 LV 2.00 % Scotchban FC-809 0.22% NaOH (pH of 20% solids solution was 8.8) | uniform, no sediment | uniform, no sediment | uniform, no sediment |
| 97.78% Polymer E-949 2.00% Zonyl RP 0.22% NaOH (pH of 20% solids solution was 8.6) | uniform, no sediment | uniform, no sediment | uniform, no sediment |
| 97.78% ECR-77 2.00% Zonyl RP 0.22% NaOH (pH of 20% solids solution was 8.5) | uniform, no sediment | uniform, no sediment | uniform, no sediment |

CP-261 LV is a homopolymer of dimethyl diallyl ammonium chloride.
Polymer E-949 is a copolymer of 90% by weight dimethyl diallyl ammonium chloride and 10% by weight acrylamide.
ECR-77 is a homopolymer of benzyl trimethyl ammonium chloride.
*The formulations were prepared at 20% solids with water as the diluent.

Although the instant invention has been described above in terms of the use of certain mono- and bis-(1H,1H,2H,2H-perfluoroalkyl)phosphates as the essential component of the improved polymer composition of this invention, many obvious modifications will suggest themselves to one skilled in the art from a consideration of the foregoing specification. It will be obvious, for example, that fluorocarbons other than th perfluoroalkyl phosphates disclosed above could be substituted in the practice of the instant invention. Included among such fluorocarbons, for example, are long chain polyfluoro aliphatic fluorocarbons substituted with polar functions such as carboxyl, carbamate, carboxamide, sulfonamide, sulfonate, amino or quaternary amine groups. Applicant considers all such obvious modifications to be the full equivalent of the perfluoroalkyl phosphates specifically disclosed herein and to fall within the scope of the instant invention.

I claim:

1. An electroconductive polymer composition containing from 90 to 99.5% by weight of a water-soluble electroconductive cationic-quarternary ammonium polymer; sufficient amounts of a stabilizer to adjust the pH to 8.0 or more, said stabilizer selected from the group consisting of potassium hydroxide, sodium hydroxide and ammonium hydroxide; and from 0.5 to 10% by weight of the polymer composition of mono- and bis-(1H,1H,2H,2H-perfluoroalkyl)phosphate esters of the formula:

$$(C_mF_{2m+1}C_nH_{2n}O)_yPO(OM)_{3-y}$$

wherein m is an integer between 4 and 10, n is an integer between 1 and 11, y is 1 or 2 and M is a water-solubilizing cation selected from the group consisting of an alkali metal, ammonium or substituted ammonium; or ammonium bis-(N-ethyl-2-perfluoroalkylsulfonamido ethyl)phosphates, containing not more than 15% ammonium mono(N-ethyl-2-perfluoroalkylsulfonamido ethyl)phosphates, where the alkyl group is more than 95% $C_8$ and the salts have a fluorine content of 50.2% to 52.8% as determined on a solids basis.

2. An electroconductive polymer composition as in claim 1 in which the water-solubilizing cation is diethanolamine and $C_m$ and $C_n$, taken together, constitute a straight chain of at least eight carbon atoms.

3. An electroconductive polymer composition as in claim 2 in which the fluorocarbon is a member selected from the group consisting of diethanolamine salts of mono- and bis-(1H,1H,2H,2H-perfluoroalkyl)phosphates wherein the alkyl group is even numbered in the range $C_8$–$C_{18}$ and the salts have a fluorine content of 52.4 to 54.4% as determined on a solids basis.

4. An electroconductive polymer composition as in claim 1 in which the cationic-quaternary ammonium polymer is a member selected from the group consisting of poly(dimethyl diallyl ammonium chloride), a copolymer of dimethyl diallyl ammonium chloride and diacetone acrylamide containing from 70 to 98% of diallyl monomer units, polyvinylbenzyl trimethylammonium chloride, polymethacryloloxyethyl trimethyl ammonium chloride, polymethacryloloxyethyl trimethyl ammonium methosulfate, polyepichlorohydrin 80 to 100% quaternized with trimethylamine, copolymers of acrylamide and methacryloloxyethyl trimethyl ammonium chloride containing from 90 to 99.5% methacryloloxyethyl monomer, and poly-(methacryloloxyethyl dimethyl hydroxyethyl ammonium chloride).

* * * * *